United States Patent [19]

Baker

[11] Patent Number: 5,134,781
[45] Date of Patent: Aug. 4, 1992

[54] GEOMETRIC SIMULATOR FOR COORDINATE MEASURING MACHINE

[76] Inventor: Stephen H. Baker, 5 Doverdale Ct., Greenville, S.C. 29615

[21] Appl. No.: 640,917

[22] Filed: Jan. 14, 1991

[51] Int. Cl.$^5$ .................. G01B 3/30; G01C 25/00
[52] U.S. Cl. ........................ 33/502; 33/567; 73/1 J
[58] Field of Search .............. 33/502, 503, 567; 73/1 J, 1 E, 1 R

[56] References Cited

U.S. PATENT DOCUMENTS

| | | |
|---|---|---|
| 1,554,392 | 9/1925 | Weaver . |
| 2,433,421 | 12/1947 | Bowness . |
| 3,845,560 | 11/1974 | Sommer .................. 33/567 |
| 3,908,278 | 9/1975 | Sundahl . |
| 4,168,576 | 9/1979 | McMurtry . |
| 4,364,182 | 12/1982 | Jones . |
| 4,369,581 | 1/1983 | Lenz .................. 33/503 X |
| 4,373,267 | 2/1983 | Lycan . |
| 4,429,464 | 2/1984 | Burrus . |
| 4,523,450 | 6/1985 | Herzog .................. 73/1 J |
| 4,777,818 | 10/1988 | McMurtry .................. 73/1 R |
| 4,932,136 | 6/1990 | Schmitz et al. .................. 33/502 |
| 4,945,501 | 7/1990 | Bell et al. .................. 33/503 X |
| 4,962,591 | 10/1990 | Zeller et al. .................. 33/502 |

FOREIGN PATENT DOCUMENTS

| | | |
|---|---|---|
| 311434 | 3/1952 | Fed. Rep. of Germany . |
| 716337 | 12/1931 | France . |
| 202611 | 8/1989 | Japan . |

OTHER PUBLICATIONS

Neumann, H. J., "Monitoring of Coordinate Measuring Machines with a Test Standard", QZ Qualitat und Zuverlassigkeit vol. 4, pp. 182-188 (1989).

*Primary Examiner*—William A. Cuchlinski, Jr.
*Assistant Examiner*—C. W. Fulton
*Attorney, Agent, or Firm*—Dority & Manning

[57] ABSTRACT

A geometric simulator apparatus is provided for testing the measurement accuracy of coordinate measuring machines, including the software therefore. A three-tiered cylindrical solid structure includes two differently sized cylinder diameters. A pair of parallel flat planar surfaces is formed perpendicular to the planar flat top surface. The bottom surface is a flat annular-shaped surface that defines a cavity which can be used to support the apparatus during storage or transport. A separate attachment is provided for introducing error measurements into the testing of the coordinate measuring machine. The attachment includes a flexible thin plate of predetermined thickness and having an elastic strap attached to each end to hold the plate against one of the cylindrical outer surfaces of the simulator apparatus.

18 Claims, 4 Drawing Sheets

GEOMETRIC SIMULATOR FOR COORDINATE MEASURING MACHINE

BACKGROUND OF THE INVENTION

The present invention relates to measurement standards and more particularly to a standard for checking the accuracy of a coordinate measuring machine (CMM).

A coordinate measuring machine (CMM) measures objects by making contact in a variety of locations, and recording the x, y and z location of the probe, as described in U.S. Pat. Nos. 4,168,576 and 4,364,182, which are hereby incorporated herein by reference. After all the contact points are collected, the coordinates are mathematically compared to an ideal geometric shape. The CMM displays the characteristics of the object to the user. The kinds of characteristics that might be displayed include the object's size, its relative position to an established coordinate system, and often, its deviation from an ideal geometric shape.

The geometric shapes which can be measured or detected by a CMM are: sphere, circle, flat surface (e.g., a plane), cone, cylinder, ellipse, line, and point.

However, the CMM itself must be calibrated. Current practice in contact type CMM calibration uses a qualified sphere to establish the calibration of the contact probes. Noncontact CMMs, such as those using reflected laser beams or other methods of determining the distance from the CMM's probe to the object, may use a variety of calibration masters for initial machine calibration.

OBJECTS AND SUMMARY OF THE INVENTION

It is a principal object of the present invention to provide an apparatus that can replicate all of the shapes, except a sphere, that can be detected by a CMM, thereby allowing almost all of the capabilities of the CMM to be tested by a single standard.

It is another principal object of the present invention to provide an apparatus that can replicate all of the shapes, except a sphere, that can be detected by a CMM, yet the apparatus is easy to manufacture and easy to calibrate.

Still another principal object of the present invention is to provide an apparatus that can replicate all of the shapes, except a sphere, that can be detected by a CMM, yet the apparatus can be calibrated by measurements performed on equipment that is independent of the CMM.

It is a further principal object of the present invention to provide an apparatus that can replicate all of the shapes, except a sphere, that can be detected by a CMM, wherein the apparatus can be used to verify both machine and computer software accuracy of both contact and noncontact CMMs.

Yet another principal object of the present invention is to provide an apparatus that can replicate all of the shapes, except a sphere, that can be detected by a CMM, yet the apparatus is sufficiently rugged so that it can be transported easily to test a number of CMMs, without any loss of accuracy due to transport.

A further principal object of the present invention is to provide an apparatus that can replicate all of the shapes, except a sphere, that can be detected by a CMM, wherein the apparatus can be used to compare the measurement results of the CMMs of two different CMM manufacturers and thus ensure that the software supplied by different manufacturers yields the same accurate measurement results.

An additional principal object of the present invention is to provide an apparatus that can replicate all of the shapes, except a sphere, that can be detected by a CMM, yet the apparatus is easily adapted so that it can perform acceptance tests at the point of manufacture, including verifying the accuracy of software before being used in a production environment as well as verifying software accuracy periodically to assure that the software has not been tampered with.

A yet further principal object of the present invention is to provide an apparatus that can replicate all of the shapes, except a sphere, that can be detected by a CMM, yet permits the introduction of a controlled error into the CMM test.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the geometric simulator apparatus of the present invention defines a solid structure formed of a precisely machineable material such as stainless steel or another material that also resists oxidizing deposits that would change the dimensions of the outer surfaces of the apparatus of the present invention. The overall shape of the apparatus of the present invention somewhat resembles a wedding cake insofar as it defines three separate tiers, with the top tier having a narrower breadth than the bottom tier. The top tier defines a circular opening concentric with the center line of the three tiers, which are concentric with one another. The four side surfaces of the top tier comprise two flat surfaces disposed parallel to each other and two oppositely disposed arcuate surfaces. The upper surface of the top tier has an outer perimeter defining a circle truncated on opposite sides by parallel straight lines.

The middle tier of the apparatus of the present invention defines a right circular cylinder having a curvature identical to the curvature of the arcuate side surfaces of the top tier. The top and middle tiers are formed as a unitary structure.

The bottom tier defines a second right circular cylinder of larger diameter than the middle tier and concentric with the cylinder of the middle tier. The bottom tier also is formed as a unitary structure with the top and middle tiers.

The bottom surface of the bottom tier desirably defines a flat annular-shaped surface having a circular outer perimeter with a diameter equal to the full diameter of the bottom tier. The inner perimeter of the bottom surface has a smaller breadth than the diameter of the bottom tier and defines a cavity with a cavity bottom. A threaded hole extends axially through the center of the cavity bottom of the bottom tier and is configured for rotatably receiving a threaded shaft. The threaded hole is formed concentrically with the outer circular surface of the bottom tier. In addition, a similar threaded hole is provided through the central portion of the top tier, similarly configured for rotatably receiving a threaded shaft and disposed concentrically with respect to the circular oppositely disposed outer surfaces of the top tier.

The apparatus further preferably includes means for introducing a controlled error for testing the CMM. As embodied herein, the error testing means preferably includes an elongated flat plate member defining a pair of opposed flat planar surfaces and further defining means for disposing the plate so that one of the flat planar surfaces contacts one of the circular outer cylindrical surfaces of the middle or bottom tier. As embodied herein, the disposing means desirably includes a resilient strap member having opposite ends secured to the opposite ends of the plate member. In one embodiment, an eyelet can be disposed on each opposite end of one flat planar surface of the plate member, and an end of the resilient strap, such as an elastic member, can be tied, glued, screwed, or held by a spring-biased clip so as to be adjustable as to the length of the strap member extending between the ends of the plate member.

The accompanying drawings, which are incorporated in and constitute a part of this specification, illustrate one embodiment of the invention and, together with the description, serve to explain the principles of the invention.

DETAILED DESCRIPTION OF THE PREFERRED (EMBODIMENTS

Reference now will be made in detail to the present preferred embodiments of the present invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover the modifications and variations of this invention provided they come within the scope of the appended claims and their equivalents.

As used in this description, the words first, second, and third merely facilitate distinguishing similar structures from one another in a particular embodiment of the invention in relative terms rather than in absolute terms. Accordingly, in describing other embodiments of the invention, the reverse order may be used so that the third of something will become the first, and in describing still other embodiments the third will be left out in favor of just the first and the second.

Figure 1:
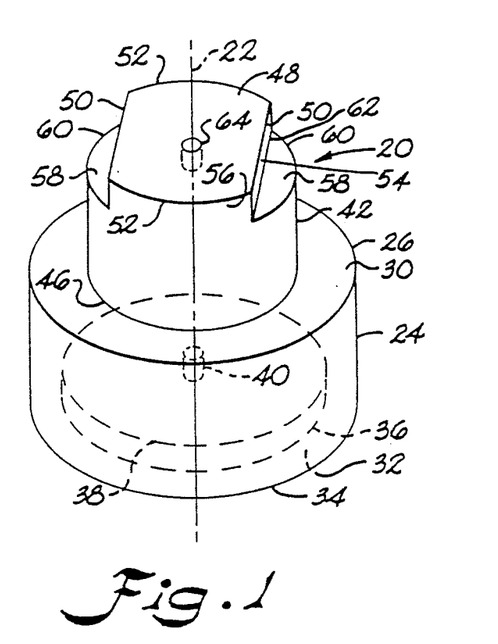
FIG. 1 illustrates an elevated perspective view of a preferred embodiment of the geometric simulator apparatus of the present invention.
Figure 2:
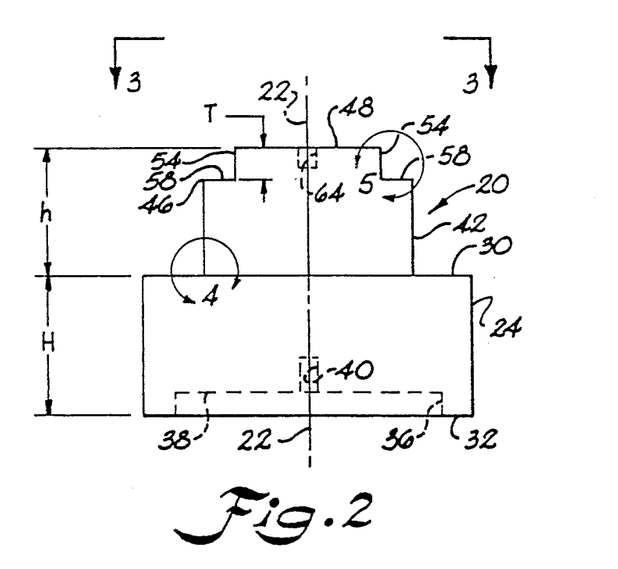
FIG. 2 is a front plan view of the embodiment of the present invention shown in FIG. 1.
Figure 3:
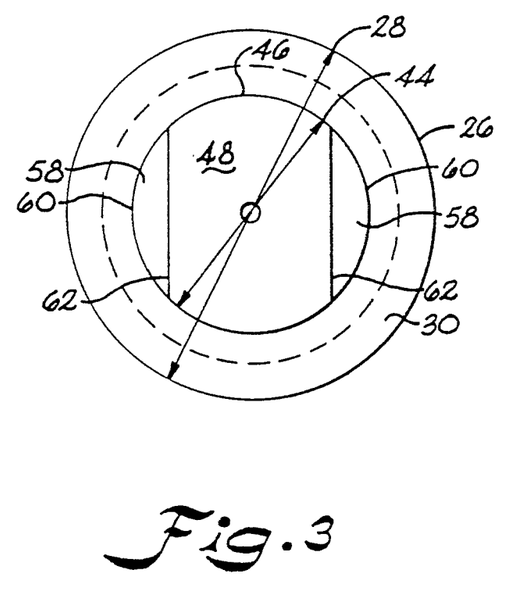
FIG. 3 is a top plan view of the embodiment of the present invention shown in FIGS. 1 and 2.

In accordance with the geometric simulator apparatus of the present invention, a base member, an intermediate member, and an apex member can be integrally formed as a generally solid, generally cylindrical, structure having at least two outer circular cylindrical surfaces of different diameters. A preferred embodiment of the geometric simulator of the present invention is shown in FIGS. 1 and 2 and is generally designated by the numeral 20. As shown in FIGS. 1 and 2 for example, simulator apparatus 20 is symmetrically formed about a central axis of symmetry 22. In accordance with the simulator apparatus of the present invention, the base member (or bottom tier) defines a first cylindrical outer surface. As shown in FIGS. 1 and 2 for example, simulator 20 includes a cylindrical outer surface 24. As shown in FIG. 3 for example, first cylindrical outer surface 24 defines a first circular transverse perimeter 26, which defines a constant first diameter 28 (schematically shown in FIG. 3 by the longer straight solid line with arrowheads at each end and designated 28).

The base member also defines a first top surface that is disposed normal to the first cylindrical surface and defines a level plane. As shown in FIGS. 1-3 for example, the top surface of the base member defines a bottom ridge surface in the form of a flat annular-shaped surface 30.

In further accordance with the present invention, the base member further defines a bottom surface. As embodied herein and shown in FIGS. 1 and 2 for example, the bottom surface of the base member preferably defines a flat level plane in the form of an annular-shaped surface 32. As shown in FIG. 1 for example, flat annular-shaped surface 32 is defined by a circular outer perimeter 34 having the same diameter as circular transverse perimeter 26 of first cylindrical outer surface 24. As shown in FIGS. 1 and 2 for example, bottom surface 32 defines an inner perimeter 36 which desirably is formed as a circle with a maximum breadth smaller than the first diameter 28. However, inner perimeter 36 can be formed of a differently shaped closed perimeter, if desired.

Moreover, inner perimeter 36 defines the outer perimeter of a shallow cavity and defines the opening to such cavity. As shown in FIGS. 1 and 2 for example, the cavity so formed is defined by a cavity bottom surface 38. The perimeter of cavity bottom 38 also is desirably formed as a circular perimeter. The cavity bottom provides a non-critical surface that can be rested atop a pedestal for storing the geometric simulator apparatus of the present invention without contacting any of its critical surfaces.

In still further accordance with the present invention, a threaded bottom hole desirably is formed along the central axis of symmetry through the cavity bottom surface. As embodied herein and shown in FIGS. 1 and 2 for example, a threaded bottom hole 40 has its central axis of symmetry coincident with central axis of symmetry 22. Bottom hole 40 desirably is threaded for rotatably receiving a threaded shaft (not shown) on which the apparatus can be mounted for transport or stored when not in use. Transported or stored in this fashion, none of the surfaces of the apparatus need be contacting another surface, where they might become contaminated or damaged.

As shown in FIG. 2 for example, the vertical height H of the base member can be made about three inches, which also can be the length of first diameter 28 shown in FIG. 3 for example. The depth of the cavity can be about one-quarter inch, while the maximum breadth of the cavity can be a diameter of about two inches. The transverse diameter of threaded bottom hole 40 can be about three-eighths inch, while the depth can be about one-half inch and tapped with 24 threads per inch.

In further accordance with the present invention, the intermediate member can be defined by a second cylindrical outer surface. As embodied herein and shown in FIGS. 1 and 2 for example, the intermediate member can define a second cylindrical outer surface 42. As shown schematically by the shorter straight solid line designated 44 in FIG. 3 for example, second cylindrical outer surface 42 defines a second diameter 44 which is smaller than first diameter 28. Second cylindrical outer surface 42 is disposed concentric with and parallel to first cylindrical outer surface 24. As shown in FIGS. 1–3 for example, second cylindrical outer surface 42 defines a second circular transverse perimeter 46. Moreover, second circular perimeter 46 forms the inner circumference of bottom ridge surface 30, while first circular perimeter 26 forms the outer circumferential boundary of bottom ridge surface 30. Bottom ridge surface 30 is parallel to the flat plane of bottom surface 32.

If the intermediate member were formed of a separate structure that was joined to the base member, the bottom surface of the intermediate member and the top surface of the base member interior of second perimeter 46 would be preferably formed as parallel flat planes so as to be easily integrated with one another by some method of joining them together one atop the other.

In still further accordance with the present invention, an apex member defines a top surface and a side surface. As embodied herein and shown in FIGS. 1–3 for example, the apex member defines a top surface 48. As shown in FIG. 1 for example, top surface 48 defines an outer top perimeter formed by a pair of oppositely disposed top lines 50, which are straight lines disposed parallel to each other and having the same length. The outer top perimeter also is formed by a pair of oppositely disposed top circular arcs 52. The opposite end of each arc 52 is connected to the opposite end of a straight top line 50 to form a closed outer top perimeter of top surface 48. The radius of curvature of each circular top arc 52 is equal to one-half the diameter 44 of second cylindrical surface 42.

As shown in FIGS. 1 and 2 for example, the apex member further defines a side surface that includes a pair of parallel oppositely disposed flat planar surfaces 54 and a pair of oppositely disposed cylindrically curved surfaces 56 (only one such curved surface 56 being visible in the view shown in FIG. 1 for example). As shown in FIGS. 1 and 2 for example, the side surface is a cylindrical surface formed by a straight line moving parallel to a fixed straight line and intersecting a fixed curve, wherein the fixed curve defines the top perimeter of top surface 48. Each curved surface 56 is concentric with and identically configured with second outer cylindrical surface 42 and forms a continuous extension thereof. The side surface of the apex member is disposed normal to top surface 48 and is connected at one free edge to the outer top perimeter.

As shown in FIGS. 1–3 for example, a pair of oppositely disposed top ridge surfaces 58 form the uppermost surfaces of the intermediate member which join with the lower edges of flat planar surfaces 54. Each top ridge surface 58 defines a flat surface having a perimeter defined by a circular arc 60 joined at each end by an end of the straight line projection 62 of straight top line 50 onto top ridge surface 58. Each circular arc has a radius of curvature equal to one half of the constant diameter 44 of second circular outer cylindrical surface 42. Each top ridge surface 58 is disposed symmetrically opposite to the other top ridge surface with straight line portions 62 disposed parallel to one another and facing toward one another. As shown in FIG. 1 for example (also see FIG. 5), the straight line projection 62 of each top ridge surface 58 is disposed beneath the lower edge of one of flat planar surfaces 54 of the side surface of the apex member.

As shown in FIGS. 1 and 2 for example, a threaded top hole 64 is configured for rotatably receiving a threaded shaft. Top hole 64 is formed concentrically with second cylindrical outer surface 42 and through top surface 48. The central axis of symmetry of threaded top hole 64 is coincident with central axis of symmetry 22.

Threaded top and bottom holes 64 and 40 facilitate attachment of apparatus of the present invention to angle plates for dimensional inspection or presentation of the central axis of symmetry 22 to all 3 CMM axes. In addition, a carrying handle may be inserted into top hole 64.

As shown in FIG. 2 for example, the vertical height h of the combined intermediate member and apex member can be about three inches, while the height T of the apex member alone can be about one half inch. The latter also is the height of each of flat planar surface 54 and each cylindrically curved surface 56. As shown in FIG. 3 for example, the length of second diameter 44 can be about two inches. The height to diameter ratio of each of the base member and the combined intermediate and apex members is not particularly important, but second diameter 44 should be at least ⅛ less than first diameter 28. The distance between the two flat planar surfaces 54 can be about one and one-half inches, and the length of each straight top line 50 can be about one inch. The transverse diameter of threaded top hole 64 can be about three-eighths of an inch, while the depth can be about one-half inch and tapped with 24 threads per inch.

Figure 4:
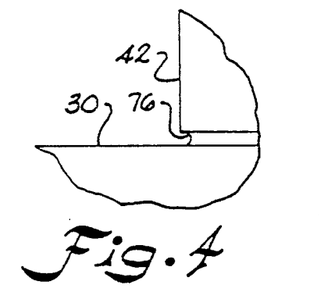
FIG. 4 is a detailed side plan view of a feature of the present invention shown in FIG. 2 circumscribed by the open circle designated by the numeral 4.
Figure 5:
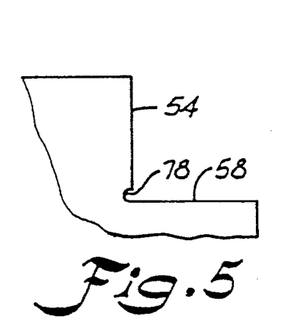
FIG. 5 is a detailed side plan view of a feature of the present invention shown in FIG. 2 circumscribed by the open circle designated by the numeral 5.

In further accordance with the present invention, stress relief formations are provided to ensure greater reliability in the dimensional integrity of the apparatus of the present invention. As shown in FIG. 4 for example, one such stress relief formation is provided at the intersection between second cylindrical outer surface 42 and bottom ridge surface 30. A semicircular shaped annular groove 76 of radius 0.015 inches is formed in the lowermost portion of second cylindrical outer surface 42. Similar stress relief formation is provided as shown in FIG. 5 for example at the base of each flat planar surface 54 where it joins with each adjacent top ridge surface 58. A straight stress relief groove 78 is formed with the identical semicircular configuration of 0.015 inch radius at the lowermost portion of each flat planar surface 54.

Figure 6:
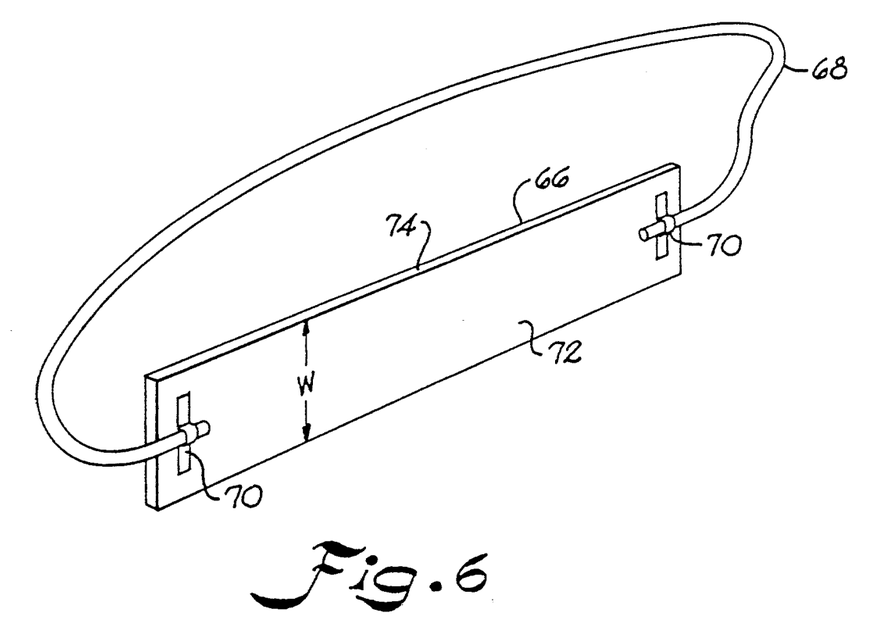
FIG. 6 is an elevated perspective view of a component of an embodiment of the present invention.

In further accordance with the present invention, means are provided for introducing a controlled error for testing the CMM. As embodied herein and shown in FIG. 6 for example, the error testing means preferably includes an elongated flat plate member 66, which preferably is formed as a thin rectangular plate of width W and thin narrow side edges 74 defining a constant thickness between a pair of opposed, parallel flat planar surfaces 72. Plate 66 can be formed from a thin, flexible piece of resilient metal such as steel. An array of plates 66 can be provided, each with a different thickness of narrow edges 74. The range of different thicknesses that typically are made available can include, but are not limited to, 0.0001 to 0.005 inches, in incremental steps of 0.0001 or 0.0005 inches. The length of plate 66 varies independently of thickness and typically ranges from ⅛ to ¼ of the circumference of the particular outer cylindrical surface of the apparatus of the present invention.

The error means also includes means for disposing the plate member with one of its flat planar surfaces contacting one of the first or second cylindrical outer surfaces. As embodied herein and shown in FIG. 6 for example, the disposing means can include a resilient strap member 68. Desirably, the opposite ends of strap member 68 are secured to the opposite ends of plate member 66. Strap member 68 can define a heavy duty stretchable elastic member formed of rubber or another resilient material that is not abrasive. Means for attaching the opposite ends of the strap member 68 to the opposite ends of plate member 66 can include any one of several forms of attachment, such as eyelets 70, adhesives, screws, hooks, or spring-biased clips.

In operation, plate member 66 is disposed with one of its flat planar surfaces 72 resting against one of first or second circular outer cylindrical surfaces 24, 42 and held thereon with resilient strap member 68, which has been stretched to expand around the diameter of the respective outer cylindrical surface 24 or 42. The material from which strap member 68 is formed is chosen so that contact with either outer cylindrical surface 24 or 42 does not damage or alter the dimensions of the respective outer cylindrical surface 24 or 42 in any way. The elastic strap member 68 is stretched taut enough, and the metal of plate 66 is flexible enough to ensure that the does not move during measurement when plate 66 is in contact with apparatus of the present invention. The width W of plate 66 is such that two or more similar plates 66 may be diametrically located, without interference to the measurement process due to strap member 68. Desirably, plate member 66 has one of is narrower elongated edges 74 resting atop bottom ridge surface 30 and flat planar surface 72 resting against a portion of second circular outer cylindrical surface 42.

The geometric simulator of the present invention serves as a master for checking the accuracy of a CMM and can replicate the following shapes: cone, cylinder, circle, ellipse, surface, line, and point. The geometric simulator of the present invention cannot be used to check the accuracy of the CMM's spherical measurement. However, due to the nature of CMM calibration, a qualified sphere normally would be available to establish the calibration of the contact probes.

Figure 7A:
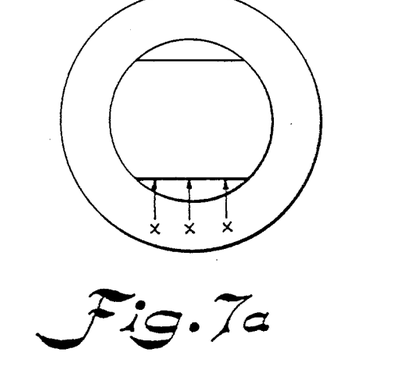
FIG. 7a illustrates a top plan view of where a CMM would contact an embodiment of the present invention to check a linear measurement.
Figure 7B:
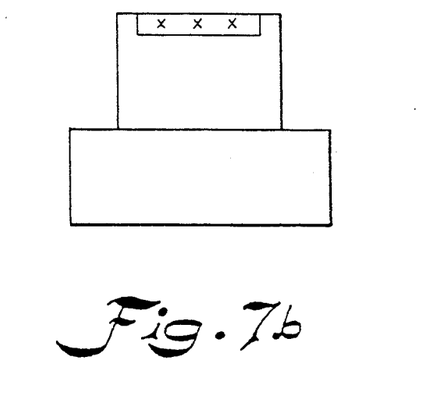
FIG. 7b illustrates a front plan view of where a CMM would contact an embodiment of the present invention to check a linear measurement.
Figure 8A:
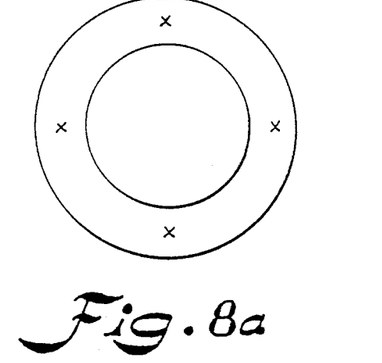
FIG. 8a illustrates a top plan view of where a CMM would contact an embodiment of the present invention to check a flat planar surface measurement.
Figure 8B:
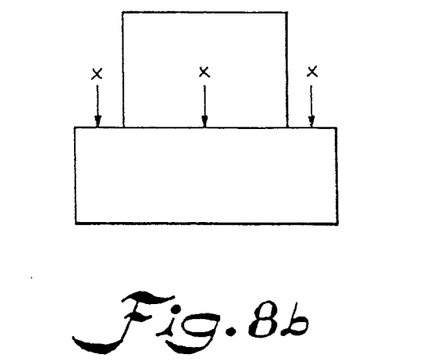
FIG. 8b illustrates a side plan view of where a CMM would contact an embodiment of the present invention to check a flat planar surface measurement.
Figure 9A:
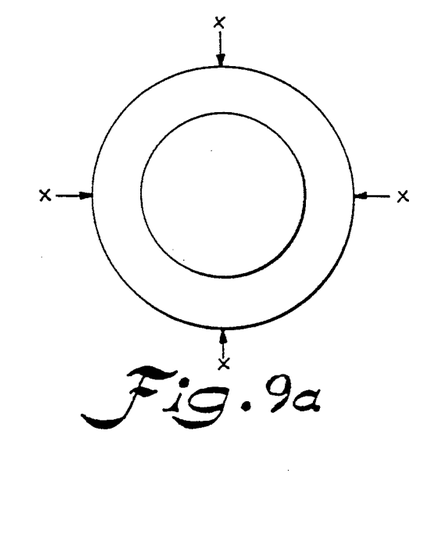
FIG. 9a illustrates a top plan view of where a CMM would contact an embodiment of the present invention to check a circle measurement.
Figure 9B:
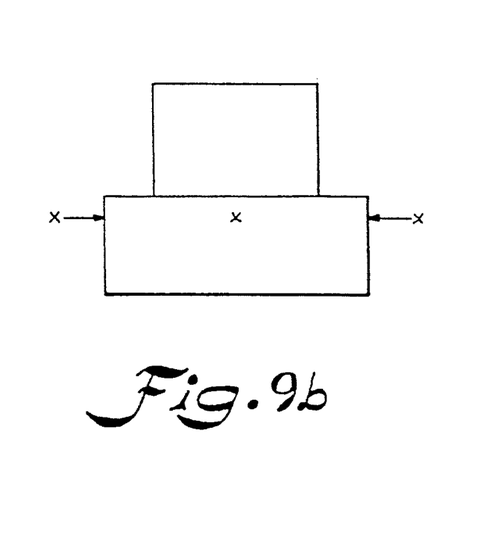
FIG. 9b illustrates a side plan view of where a CMM would contact an embodiment of the present invention to check a circle measurement.
Figure 10A:
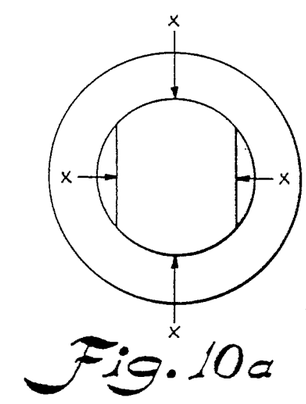
FIG. 10a illustrates a top plan view of where a CMM would contact an embodiment of the present invention to test the CMM for measuring an ellipse.
Figure 10B:
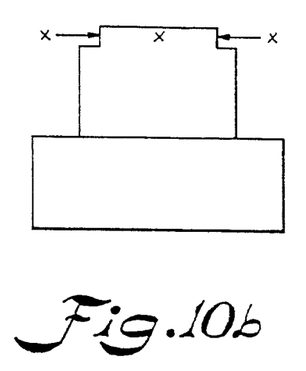
FIG. 10b illustrates a side plan view of where a CMM would contact an embodiment of the present invention to test the CMM for measuring an ellipse.
Figure 11A:
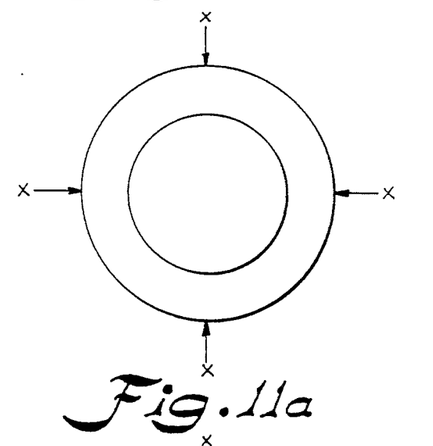
FIG. 11a illustrates a top plan view of where a CMM would contact an embodiment of the present invention to check a cylinder measurement.
Figure 11B:
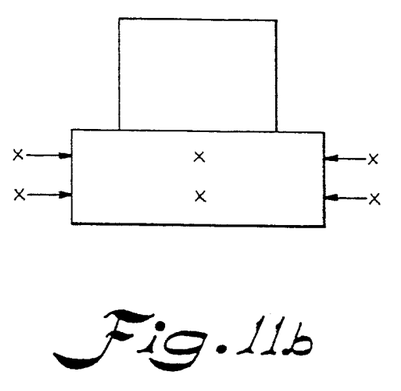
FIG. 11b illustrates a side plan view of where a CMM would contact an embodiment of the present invention to check a cylinder measurement.
Figure 12A:
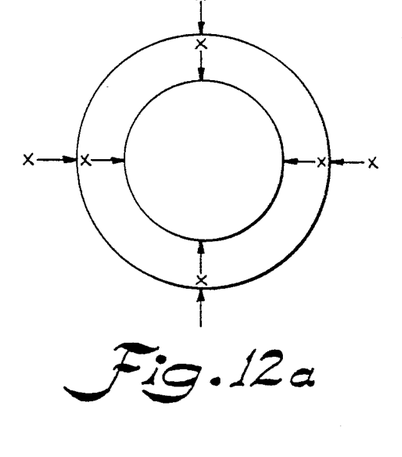
FIG. 12a illustrates a top plan view of where a CMM would contact an embodiment of the present invention to check a cone measurement.
Figure 12B:
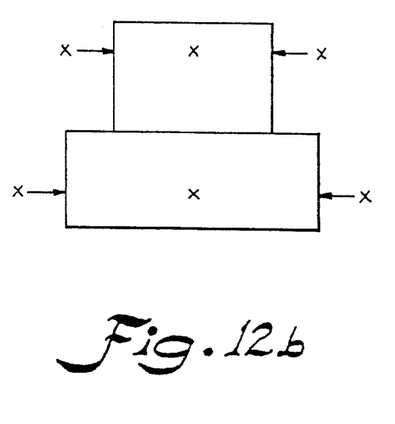
FIG. 12b illustrates a side plan view of where a CMM would contact an embodiment of the present invention to check a cone measurement.

Reference is made to the attached isometric drawings of FIGS. 7a through 12b to demonstrate how the apparatus of the present invention generates each geometric feature for the CMM to measure. In each of FIGS. 7a through 12b, each letter "x" denotes a separate location where the probe of a contact CMM would be applied to touch the geometric simulator apparatus of the present invention in order to check the measurement of the particular geometric shape in question. In the case of a non-contact CMM, each letter "x" in each of FIGS. 7a through 12b denotes a separate location where the scanning beam of the non-contact CMM would scan the geometric simulator apparatus of the present invention in order to check the measurement of the particular geometric shape in question. Note that these locations denoted by the "x's" are disposed away from edges of the apparatus, because the edges are where any manufacturing inaccuracies of size and form are most likely to occur. FIGS. 7a and 7b demonstrate the linear measurement. FIGS. 8a and 8b demonstrate the flat planar surface measurement. FIGS. 9a and 9b demonstrate the circle measurement. FIGS. 10a and 10b demonstrate the ellipse measurement. FIGS. 11a and 11b demonstrate the cylinder measurement, and FIGS. 12a and 12b demonstrate the cone measurement.

To replicate all the listed geometric shapes in individual machined shapes would be far more expensive than the cost of the apparatus of the present invention. Moreover, calibration of these shapes without the use of a CMM would be extremely time consuming and error prone, without the special features of the apparatus of the present invention. It is important to note that the value of the apparatus of the present invention is independent of its physical size.

Calibration of the apparatus of the present invention would be performed initially on a roundness checker, for concentricity and roundness. Then the absolute size of the diameters and heights are checked using linear dimensional measurement techniques. Direct comparison to master gage blocks is easily performed. This allows independent calibration traceable to the National Institute of Standards and Technology (NIST), a well known requirement of calibration systems.

Geometric simulator 20 is then measured on the CMM, and the initial results recorded for future reference. Direct comparison of CMM performance is also directly compared to the independently measured features. Periodic measurement of geometric simulator 20 by the independent devices, and the CMM can then be performed periodically to monitor the accuracy of the CMM machine and software. Comparison against the initial readings is useful to monitor CMM machine wear, but not a requirement to obtain value from the apparatus of the present invention.

Additional CMM machines can be verified with the easily transported apparatus of the present invention. A direct comparison of the measurement results by CMMs of two different manufacturers can be readily compared. This comparison provides the user with assurance that the software supplied by different manufacturers yields the same accurate measurement results.

Acceptance tests of new CMMs can easily be performed at the point of manufacture. The apparatus of the present invention travels easily, and is extremely rugged, to assure no loss of accuracy due to transport.

New software provided by the CMM manufacturer can be verified for accuracy before use in a production environment. Periodic verification of software can be performed to assure no tampering with the software.

It is important to determine how the CMM measures both ideal shapes, and shapes with size and form errors which will result from inaccuracies found in normal manufacturing processes. The use of the size and error testing means attachment adds versatility to the apparatus of the present invention. By introducing a controlled error into the CMM check, additional verification of CMM measurement output is performed.

Fabrication of an embodiment of the apparatus of the present invention starts with a cylinder of metal or ceramic. If made from metal, the apparatus of the present invention can be machined to rough size, heat treated to achieve hardness, and lapped to finished size and form. The use of ceramic eliminates the need to heat treat. One half of the starting cylinder, is machined to a smaller diameter cylinder, taking care to ensure that the centerline of the smaller cylinder is precisely coaxial to the larger cylinder. The rough stock is drilled for center at each respective end. After mounting the rough stock apparatus of the present invention on the centers, the outer cylindrical surfaces 24, 42, bottom ridge surface 30, bottom surface 32, and top surface 48 are rough turned to size and perpendicularity. Then, heat treating hardens the rough stock material to minimize wear during use.

The centers are again used to lap the cylindrical outer surfaces to finished size and form (roundness and concentricity). The flat bottom surface 32 is lapped flat, and perpendicularity to the cylinder axis 22 is also controlled. Flat lapping is used to establish top surface 48 and bottom ridge surface 30 flat and parallel to bottom surface 32 and perpendicular to central axis of symmetry 22. It is only necessary that either top surface 48 or bottom ridge surface 30 be machined flat and parallel to bottom surface 32. The tolerances for parallelism, concentricity, and perpendicularity are each within 0.000010 inches. The cavity defined in the bottom of the base member need not be precisely machined.

Flat planar surfaces 54 are machined so as to truncate top surface 48 of the smaller diameter cylinder in a manner that disposes planar surfaces 54 precisely parallel to each other, as well as symmetric about and parallel to cylinder axis 22. The flat planar surfaces 54 are initially machined with a milling machine, and hand lapped to finished size, position and flatness. Relief grooves 76 and 78 facilitate finish machining of second outer cylindrical surface 42 and flat planar surfaces 54. Surface roughness should be kept to a minimum, so that it does not exceed 1/5 of the tolerance of the finished machined features.

The apparatus of the present invention allows verification of both machine and computer software accuracy of both contact and noncontact CMMs. The apparatus of the present invention is easy to fabricate, and most importantly, can be calibrated by measurements performed on other equipment, independent of the CMM. The capability to perform independent calibration of equipment is a well known requirement of a good calibration system.

The relative accuracy of the apparatus of the present invention compared to the CMM is dependent on the state of the art manufacturing capability, and total cost limitations, but a ratio of the accuracy of the geometric simulator to the accuracy of the CMM could easily exceed 5 to 1. To ensure proper calibration, the accuracy of the master is normally ten times better than the accuracy of the item being calibrated. Standard practice in meteorology allows use of masters less than ten times better where, as here, the state of the art in measurement accuracy or accuracy in manufacturing capabilities is involved.

What is claimed is:

1. A geometric simulator apparatus for use with a coordinate measuring machine, the simulator apparatus comprising:
   (a) a first cylindrical outer surface,
      i) said first cylindrical outer surface having a first circular transverse perimeter, and
      ii) said first circular transverse perimeter defining a constant first diameter;
   (b) a top surface disposed normal to said first cylindrical surface,
      ii) said top surface defining an outer top perimeter forming a pair of oppositely disposed parallel top straight lines of equal length, with each end of each top line joined to an end of the other top line by a top circular arc having a radius of curvature equal to one half said constant first diameter;
   (c) a side surface,
      i) said side surface being disposed normal to said top surface and connected at one free edge to said outer top perimeter, and
      ii) said side surface defining a pair of parallel oppositely disposed flat planar surfaces;
   d) a bottom surface,
      i) said bottom surface being disposed normal to said first cylindrical outer surface and parallel to said top surface, and
      ii) said bottom surface defining a flat annular-shaped surface having a circular outer perimeter with an outside diameter equal to said constant first diameter and an inner perimeter with a maximum breadth smaller than said first diameter;
   (e) a shallow cavity defining an opening,
      i) said cavity opening being defined by said inner perimeter of said bottom surface, and
      ii) said cavity defining a cavity bottom; and
   (f) a threaded bottom hole configured for rotatably receiving a threaded shaft,
      i) said threaded bottom hole being formed concentric with said first cylindrical outer surface and through said cavity bottom, and ii) said threaded bottom hole having a central axis of symmetry coincident with the central axis of symmetry of said first cylindrical outer surface.

2. A geometric simulator apparatus for use with a coordinate measuring machine, the simulator apparatus comprising:
(a) a first cylindrical outer surface,
   i) said first cylindrical outer surface having a first circular transverse perimeter, and
   ii) said first circular transverse perimeter defining a constant first diameter;
(b) a top surface disposed normal to said first cylindrical surface,
   ii) said top surface defining an outer top perimeter forming a pair of oppositely disposed parallel top straight lines of equal length, with each end of each top line joined to an end of the other top line by a top circular arc having a radius of curvature equal to one half said constant first diameter;
(c) a side surface,
   i) said side surface being disposed normal to said top surface and connected at one free edge to said outer top perimeter, and
   ii) said side surface defining a pair of parallel oppositely disposed flat planar surfaces; and
d) a threaded top hole configured for rotatably receiving a thread shaft,
   i) said threaded top hole being formed concentric with said first cylindrical outer surface and through said top surface, and
   ii) said threaded top hole having a central axis of symmetry coincident with the central axis of symmetry of said first cylindrical outer surface.

3. An apparatus as in claim 2, further comprising:
(e) a bottom surface,
   i) said bottom surface being disposed normal to said first cylindrical outer surface and parallel to said top surface.

4. An apparatus as in claim 3, wherein:
   i) said bottom surface defining a flat annular-shaped outer surface having a circular outer perimeter with an outside diameter equal to said constant first diameter and an inner perimeter with a maximum breadth smaller than said first diameter.

5. An apparatus as in claim 4, further comprising:
(f) a shallow cavity defining an opening,
   i) said cavity opening being defined by said inner perimeter of said bottom surface, and
   ii) said cavity defining a cavity bottom.

6. An apparatus in claim 2, further comprising:
(e) a second cylindrical outer surface,
   i) said second cylindrical outer surface having a second circular transverse perimeter,
   ii) said second circular transverse perimeter defining a constant second diameter, and
   iii) said constant second diameter being larger than said constant first diameter.

7. An apparatus as in claim 6, further comprising:
(f) a bottom ridge surface,
   i) said bottom ridge surface defining a flat annular-shaped surface having a circular outer perimeter with a diameter equal to said second constant diameter and a circular inner perimeter with a diameter equal to said first constant diameter,
   ii) said bottom ridge surface being disposed perpendicular to each of said first cylindrical outer surface and said second cylindrical outer surface, and
   iii) said outer perimeter of said bottom ridge surface being connected to said second cylindrical outer surface and said inner perimeter of said bottom ridge surface being connected to said first cylindrical outer surface.

8. An apparatus as in claim 6, further comprising:
(f) a pair of top ridge surfaces,
   i) each said top ridge surface defining a flat surface having a perimeter defined by a circular arc joined at each end by an end of a straight line, each said circular arc having a radius of curvature equal to one half said second constant diameter, and
   ii) each said top ridge surface being disposed symmetrically opposite said other top ridge surface with said straight line portions of their perimeters disposed parallel to one another and facing toward one another.

9. An apparatus as in claim 2, further comprising:
(e) a bottom surface,
   i) said bottom surface being disposed normal to said first cylindrical outer surface and parallel to said top surface.

10. An apparatus as in claim 9, wherein:
   i) said bottom surface defining a flat annular-shaped surface having an outer circular perimeter with an outside diameter equal to said constant first diameter and an inner perimeter with an inner diameter smaller than said outside diameter.

11. An apparatus as in claim 10, further comprising:
(g) a shallow cavity defining an opening,
   i) said cavity opening being defined by said inner perimeter of said bottom surface, and
   ii) said cavity defining a cavity bottom.

12. A geometric simulator apparatus for use with a coordinate measuring machine, the simulator apparatus comprising:
(a) a first cylindrical outer surface,
   i) said first cylindrical outer surface having a first circular transverse perimeter, and
   ii) said first circular transverse perimeter defining a constant first diameter;
(b) a top surface disposed normal to said first cylindrical surface,
   ii) said top surface defining an outer top perimeter forming a pair of oppositely disposed parallel top straight lines of equal length, with each end of each top line joined to an end of the other top line by a top circular arc having a radius of curvature equal to one half said constant first diameter; and
(c) a side surface,
   i) said side surface being disposed normal to said top surface and connected at one free edge to said outer top perimeter, and
   ii) said side surface defining a pair of parallel oppositely disposed flat planar surfaces; and
d) a pair of top ridge surfaces,
   i) each said top ridge surface defining a flat surface having a perimeter defined by a circular arc joined at each end by an end of a straight line, each said circular arc having a radius of curvature equal to one half said first constant diameter,
   ii) each said top ridge surface being disposed symmetrically opposite said other top ridge surface with said straight line portions of their perimeters disposed parallel to one another and facing toward one another, and iii) said straight line portion of one of said top ridge surface being joined to one of said flat planar surfaces of said side surface.

13. An apparatus as in claim 12, further comprising:
(a) a threaded top hole configured for rotatably receiving a threaded shaft,
  i) said threaded top hole being formed concentric with said second cylindrical outer surface and through said top surface.

14. A geometric simulator apparatus for use with a coordinate measuring machine, the simulator apparatus comprising:
(a) a first cylindrical outer surface,
  i) said first cylindrical outer surface having a first circular transverse perimeter, and
  ii) said first circular transverse perimeter defining a constant first diameter;
(b) a second cylindrical outer surface,
  i) said second cylindrical outer surface having a second circular transverse perimeter,
  ii) said second circular transverse perimeter defining a constant second diameter, and
  iii) said constant second diameter being smaller than said constant first diameter;
(c) a bottom ridge surface,
  i) said bottom ridge surface defining a flat annular-shaped surface having an outer perimeter with a diameter equal to said first constant diameter and an inner perimeter with a diameter less than said first constant diameter,
  ii) said bottom ridge surface being disposed perpendicular to each of said first cylindrical outer surface and said second cylindrical outer surface, and
  iii) said outer diameter of said bottom ridge surface being connected to said first cylindrical outer surface;
(d) a top surface disposed normal to said second cylindrical surface,
  i) said top surface defining an outer top perimeter forming a pair of oppositely disposed parallel top straight lines of equal length, with each end of each top line joined to an end of the other top line by a top circular arc having a radius of curvature equal to one half said constant second diameter;
(e) a side surface,
  i) said side surface being disposed normal to said top surface and connected at one free edge to said outer top perimeter, and
  ii) said side surface defining a pair of parallel oppositely disposed flat planar surfaces;
(f) a bottom surface,
  i) said bottom surface being disposed normal to said first cylindrical outer surface and parallel to said top surface, and
  ii) said bottom surface defining a flat annular-shaped surface having a circular outer perimeter with an outside diameter equal to said constant first diameter and an inner perimeter with an inner diameter smaller than said outside diameter;
(g) a shallow cavity defining an opening,
  i) said cavity opening being defined by said inner perimeter of said bottom surface, and
  ii) said cavity defining a cavity bottom; and (h) a threaded bottom hole configured for rotatably receiving a threaded shaft,
  i) said threaded bottom hole being formed concentric with said first cylindrical outer surface and through said cavity bottom, and
  ii) said threaded bottom hole having a central axis of symmetry coincident with the central axis of symmetry of said first cylindrical outer surface.

15. A geometric simulator apparatus for use with a coordinate measuring machine, the simulator apparatus comprising:
(a) a first cylindrical outer surface,
  i) said first cylindrical outer surface having a first circular transverse perimeter, and
  ii) said first circular transverse perimeter defining a constant first diameter;
(b) a second cylindrical outer surface,
  i) said second cylindrical outer surface having a second circular transverse perimeter,
  ii) said second circular transverse perimeter defining a constant second diameter, and
  iii) said constant second diameter being smaller than said constant first diameter;
(c) a bottom ridge surface,
  i) said bottom ridge surface defining a flat annular-shaped surface having an outer perimeter with a diameter equal to said first constant diameter and an inner perimeter with a diameter equal to said second constant diameter,
  ii) said bottom ridge surface being disposed perpendicular to each of said first cylindrical outer surface and said second cylindrical outer surface, and
  iii) said outer diameter of said bottom ridge surface being connected to said first cylindrical outer surface and said inner perimeter of said bottom ridge surface being connected to said second cylindrical outer surface;
(d) a top surface disposed normal to said second cylindrical surface,
  i) said top surface defining an outer top perimeter forming a pair of oppositely disposed parallel top straight lines of equal length, with each end of each top line joined to an end of the other top line by a top circular arc having a radius of curvature equal to one half said constant second diameter;
(e) a side surface,
  i) said side surface being disposed normal to said top surface and connected at one free edge to said outer top perimeter, and
  ii) said side surface defining a pair of parallel oppositely disposed flat planar surfaces; and
(f) an elongated flat plate member defining a piece of resiliently flexible material having a pair of opposed flat planar surfaces separated by a constant thickness.

16. An apparatus as in claim 15, further comprising:
(g) means for disposing said plate member with one of said flat planar surfaces contacting one of said first and second cylindrical surfaces.

17. An apparatus as in claim 16, wherein said means for disposing said plate member with one of said flat planar surfaces contacting one of said first and second cylindrical surfaces includes:
  i) resilient strap member,
  ii) opposite ends of said strap member being secured to opposite ends of said plate member.

18. A geometric simulator apparatus for use with a coordinate measuring machine, the simulator apparatus comprising:

(a) a base member,
  i) said base member defining a first cylindrical outer surface,
  ii) said first cylindrical outer surface having a first circular transverse perimeter,
  iii) said first circular transverse perimeter defining a constant first diameter,
  iv) said base member defining a first top surface normal to said first cylindrical surface and defining a level plane,
  v) said first top surface being bounded by a circular perimeter having a diameter equal to said first diameter,
  vi) said base member defining a first bottom surface normal to said first cylindrical outer surface and parallel to said first top surface,
  vii) said first bottom surface defining a flat annular-shaped surface having an outer circular perimeter with an outside diameter equal to said constant first diameter and an inner perimeter with an inner diameter smaller than said first diameter,
  viii) said base member having a central axis of symmetry disposed normal to said first top surface and to said first bottom surface and extending through the center point of said first top surface,
  ix) said inner perimeter of said base member defining an opening formed through said first bottom surface,
  x) said base member defining a shallow cavity beneath said opening and defining a cavity bottom,
  xi) said base member defining a threaded bottom hole configured for rotatably receiving a threaded shaft,
  xii) said threaded bottom hole being formed concentric with said first bottom surface and through said cavity bottom, and
  xiii) said threaded bottom hole having a central axis of symmetry coincident with said central axis of symmetry of said base member;

(b) an intermediate member,
  i) said intermediate member defining a second cylindrical outer surface,
  ii) said second cylindrical outer surface having a second circular transverse perimeter,
  iii) said second circular transverse perimeter defining a constant second diameter,
  iv) said constant second diameter being smaller than said constant first diameter,
  v) said intermediate member defining a second bottom surface normal to said second cylindrical surface,
  vi) said second bottom surface having an outer circular perimeter with said second diameter,
  vii) said intermediate member being disposed with said second bottom surface contacting said first top surface of said base member and with said second cylindrical outer surface being concentric with said first cylindrical outer surface,
  viii) the portion of said first top surface left uncovered by said second bottom surface of said intermediate member defining a bottom ridge surface,
  ix) said bottom ridge surface defining a flat annular-shaped surface having an outer diameter equal to said first constant diameter and an inner diameter equal to said second constant diameter, and
  x) said intermediate member defining a second top surface normal to said second cylindrical surface and parallel to said second bottom surface; and (c) an apex member,
  i) said apex member defining a third bottom surface,
  ii) said third bottom surface defining a flat plane,
  iii) said third bottom surface defining an outer bottom perimeter forming a pair of oppositely disposed bottom straight lines of equal length, with each end of each bottom line joined to an end of the other bottom line by a bottom circular arc having a radius of curvature equal to one half said constant second diameter,
  iv) said apex member defining a third top surface,
  v) said third top surface defining a flat plane disposed normal to said third bottom surface,
  vi) said third top surface defining an outer top perimeter dimensionally equal to and disposed parallel to said outer bottom perimeter of said third bottom surface and forming a pair of oppositely disposed top straight lines of equal length, with each end of each top line joined to an end of the other top line by a circular top arc having a radius of curvature equal to one half said constant second diameter,
  vii) said apex member defining a side surface disposed normal to said third bottom surface and to said third top surface,
  viii) said apex side surface defining a pair of oppositely disposed flat planar surface and a pair of oppositely disposed cylindrically curved surfaces,
  ix) one of the side edges of each flat surface being joined to one of the side edges of one of the curved surfaces and the opposite side edge of each flat surface being joined to one of the side edges of the other one of the curved surfaces,
  x) the top edge of each said flat surface being joined to one of said top straight lines and the bottom edge of each said flat surface being joined to one of each bottom straight lines,
  xi) the top edge of each said curved surface being joined to one of said top arcs and the bottom edge of each said curved surface being joined to one of said bottom arcs,
  xii) said apex member being disposed with said third bottom surface contacting said second top surface of said intermediate member and with said curved side surfaces of said apex member being concentric with said second cylindrical outer surface,
  xiii) the portion of said second top surface left uncovered by said third bottom surface of said apex member defining a pair of top ridge surfaces,
  xiv) each said top ridge surface defining a flat surface having a perimeter defined by a circular arc joined at each end by an end of one of said bottom straight lines of said third bottom surface, each said circular arc having a radius of curvature equal to one half said second constant diameter,
  xv) each said top ridge surface being disposed symmetrically opposite said other top ridge surface with said straight line portions of their perimeters disposed parallel to one another and facing toward one another, xvi) said apex defining a threaded top hole configured for rotatably receiving threaded shaft, xvii) said threaded top hole being formed concentric with said third top surface, and xviii) said threaded top hole having a central axis of symmetry coincident with said central axis of symmetry of said base member.

* * * * *